United States Patent
Hsieh

(10) Patent No.: US 7,743,204 B2
(45) Date of Patent: Jun. 22, 2010

(54) NON-VOLATILE MEMORY DEVICE AND DATA ACCESS CIRCUIT AND DATA ACCESS METHOD

(75) Inventor: Chun-Yu Hsieh, Taichung (TW)

(73) Assignee: Transcend Information, Inc., Taipei (TW)

(*) Notice: Subject to any disclaimer, the term of this patent is extended or adjusted under 35 U.S.C. 154(b) by 362 days.

(21) Appl. No.: 11/831,977

(22) Filed: Aug. 1, 2007

(65) Prior Publication Data
US 2009/0037645 A1 Feb. 5, 2009

(51) Int. Cl.
*G06F 12/00* (2006.01)
(52) U.S. Cl. ...................................... 711/103
(58) Field of Classification Search ................. None
See application file for complete search history.

(56) References Cited

U.S. PATENT DOCUMENTS

2008/0183953 A1* 7/2008 Flynn et al. ................. 711/103

FOREIGN PATENT DOCUMENTS

TW 260826 8/2006
TW 264089 10/2006

* cited by examiner

*Primary Examiner*—Brian R Peugh
(74) *Attorney, Agent, or Firm*—Jianq Chyun IP Office

(57) ABSTRACT

A non-volatile memory device, a data access circuit and a data access method are provided. The non-volatile memory device includes a main controller, a plurality of sub-controllers and a plurality of memory blocks. The sub-controllers are coupled to the main controller and are used to execute the tasks assigned by the main controller. The memory blocks are respectively coupled to the corresponding sub-controllers. The main controller is used to divide a received main data into a plurality of sub-data, and the sub-data are respectively saved in the memory blocks through corresponding sub-controllers. Therefore, the data access speed of the non-volatile memory device is substantially speeded-up.

14 Claims, 4 Drawing Sheets

NON-VOLATILE MEMORY DEVICE AND DATA ACCESS CIRCUIT AND DATA ACCESS METHOD

BACKGROUND OF THE INVENTION

1. Field of the Invention

The present invention generally relates to a data access technique, more particularly, to a data access technique of non-volatile memory device.

2. Description of Related Art

Conventional semiconductor memory can be roughly classified into two basic types, namely, non-volatile memory and volatile random access memory (RAM). The so-called 'non-volatile memory' is a memory capable of retaining stored data even after power to the device is removed. Non-volatile memory includes, for example, read only memory (ROM), programmable ROM (PROM), erasable PROM (EPROM), electrically erasable PROM (EEPROM), mask ROM, flash memory and so on.

Volatile memory refers to those memories whose stored data will disappear when power to the device is removed. Volatile memory includes, for example, static random access memory (SRAM) and dynamic random access memory (DRAM).

FIG. 1 is a block diagram of a conventional flash memory. As shown in FIG. 1, the flash memory 10 includes a main controller 20 and a plurality of memory blocks, for example, 31, 32 and 3n. When the flash memory 10 receives a data, the data is saved in the memory block 31 by the main controller 20 until there is no more space available in the memory block 31. Thereafter, the main controller 20 will transfer the remaining data into the memory block 32 and so on. However, the conventional flash memory 10 not only has a slow data access speed, but also cannot provide output data when a portion of the data is lost or damaged.

SUMMARY OF THE INVENTION

Accordingly, the present invention provides a non-volatile memory device for enhancing the processing ability of the non-volatile memory device so as to increase its data processing speed.

The present invention also provides a data access circuit for increasing data access speed.

The present invention also provides a data access method for increasing data access speed and preventing data lost or damage.

According to an embodiment of the present invention, a non-volatile memory device is provided. The non-volatile memory device includes a main controller, a plurality of sub-controllers and a plurality of memory blocks. Each sub-controller is coupled to the main controller for executing tasks assigned by the main controller. Each memory block is coupled to a corresponding sub-controller. The main controller is used to divide a received main data into a plurality of sub-data, and the sub-data are respectively saved in the memory blocks through corresponding sub-controllers.

In an embodiment of the present invention, the main controller also saves a backup of each first sub-data in some of the memory blocks. In another embodiment, each memory block further includes a plurality of sub-memory blocks corresponding to each sub-controller. Each sub-controller also divides received first sub-data into a plurality of second sub-data and the second sub-data are respectively saved in the sub-memory blocks of a corresponding memory block. Furthermore, each sub-controller also saves a backup of the second sub-data in some of the sub-memory blocks of a corresponding memory block. In yet another embodiment, the non-volatile memory device is a flash memory.

From another point of view, the present invention provides a data access circuit adapted to a non-volatile memory having a plurality of memory blocks and each memory block having a plurality of sub-memory blocks. The data access circuit includes a main controller and a plurality of sub-controllers. Each sub-controller is coupled to a corresponding memory block. In addition, the main controller is used to divide a received main data into a plurality of first sub-data and the first sub-data are respectively saved in the memory blocks through the sub-controllers.

The present invention also provides a data access method adapted to a non-volatile memory having a plurality of memory blocks and each memory block having a plurality of sub-memory blocks. The data access method includes receiving a main data, dividing the main data into a plurality of first sub-data and respectively saving the first sub-data in the memory blocks. In addition, a backup of the first sub-data is saved in some of the memory blocks.

In an embodiment of the present invention, the data access method further includes using the backup of the first sub-data to repair the first sub-data when the first sub-data is damaged. In another embodiment, the data access method further includes reading each of the first sub-data, combining the first sub-data to form the main data, and outputting the main data.

In an embodiment of the present invention, each memory block includes a plurality of sub-memory blocks. The data access method further includes dividing each of the first sub-data into a plurality of second sub-data. The second sub-data are respectively saved in the sub-memory blocks. Furthermore, a backup of the second sub-data is saved in some of the sub-memory block. In another embodiment, the data access method further includes using the backup of the second sub-data to repair the second sub-data when the second sub-data are damaged. In yet another embodiment, the data access method further includes reading the second sub-data and combining the second sub-data to form the first sub-data.

The present invention divides a received main data into a plurality of first sub-data and respectively saves the first sub-data into a plurality of memory blocks. Therefore, data access speed is substantially increased.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
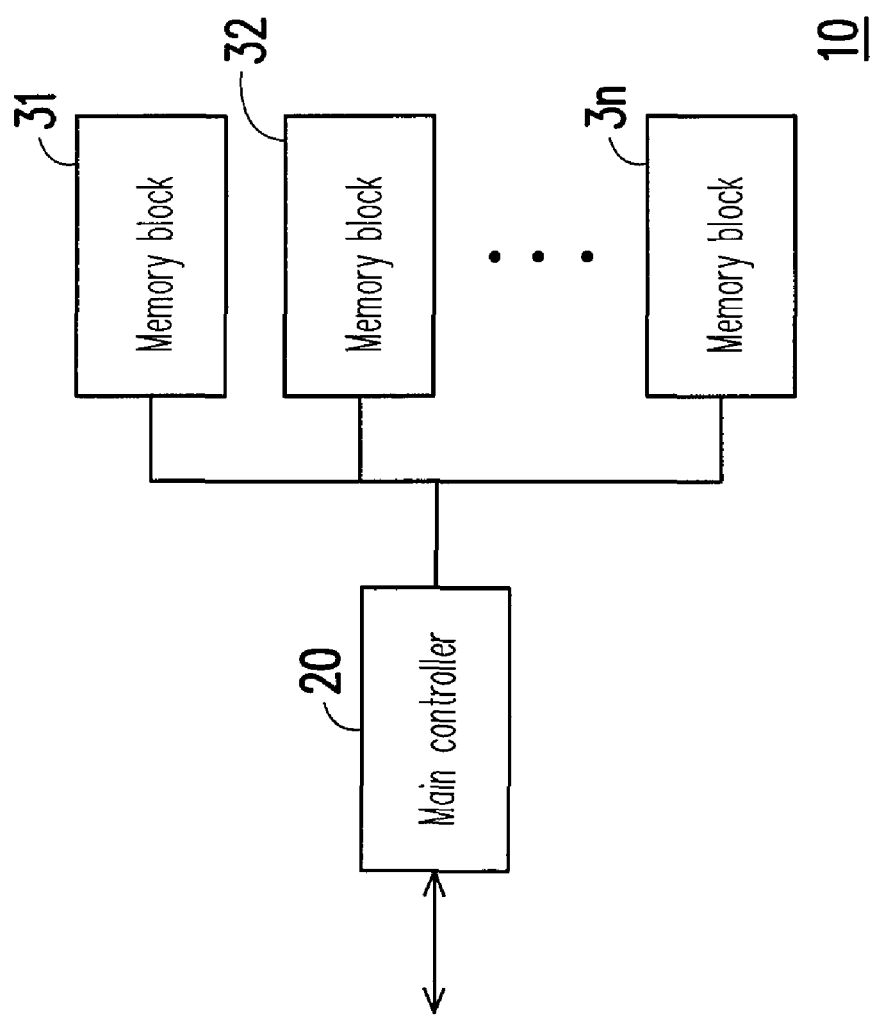
FIG. 1 is a diagram of a conventional non-volatile memory device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
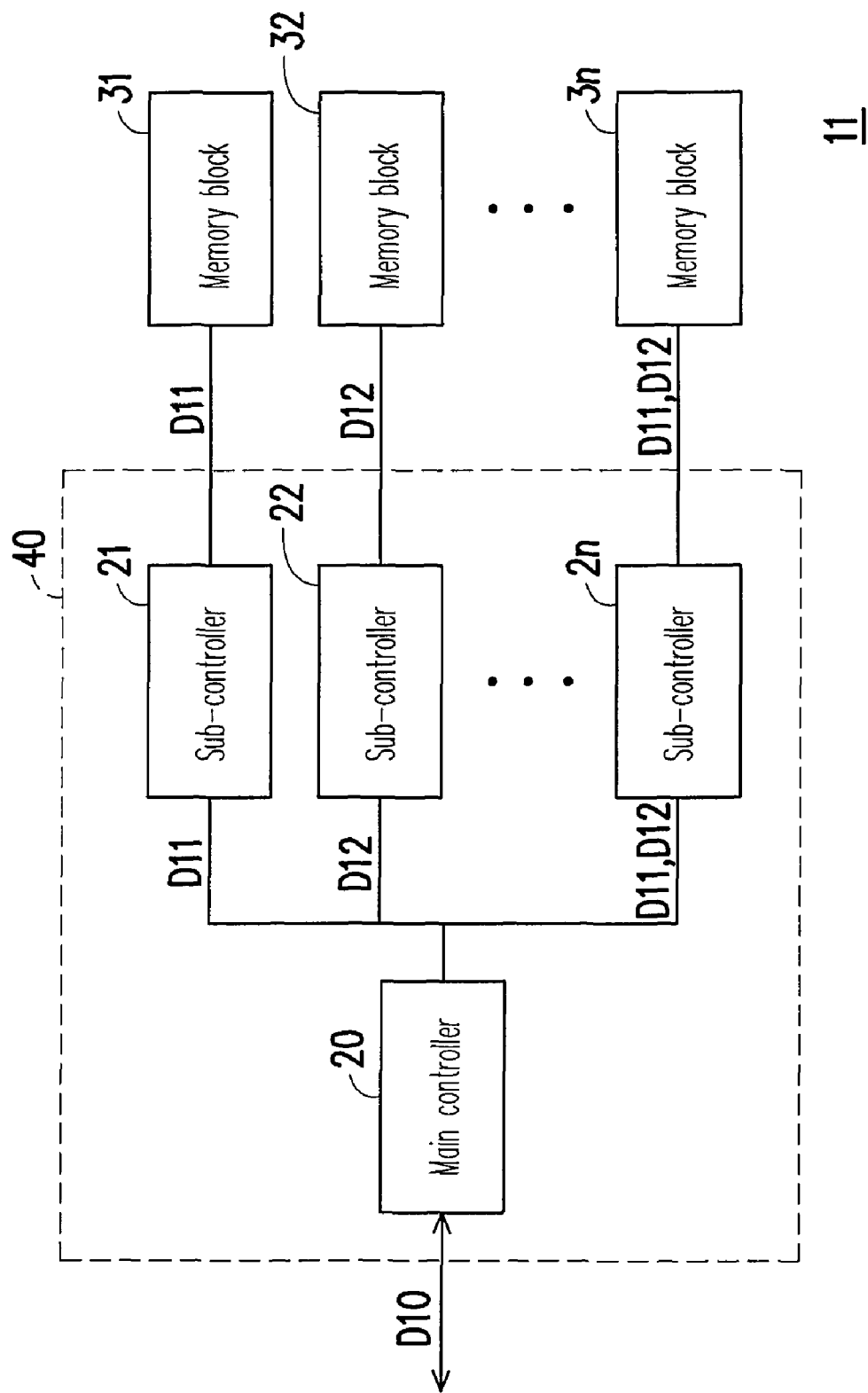
FIG. 2 is a diagram of a non-volatile memory device according to a first embodiment of the present invention.

FIG. 2 is a diagram of a non-volatile memory device according to a first embodiment of the present invention. As shown in FIG. 2, the non-volatile memory device 11 in the present invention is a flash memory or other types of memory, for example. The non-volatile memory device 11 includes a data access circuit 40 and a plurality of memory blocks, for example, 31, 32 and 3n. In the present embodiment, the data access circuit 40 is coupled to the memory blocks 31, 32 and 3n. The data access circuit 40 can be utilized to access data in the memory blocks 31, 32 and 3n.

The data access circuit 40 includes a main controller 20 and a plurality of sub-controllers, for example, 21, 22 and 2n. The sub-controllers 21, 22 and 2n are respectively coupled to the memory blocks 31, 32 and 3n. The sub-controllers 21, 22 and 2n can execute the tasks assigned by the main controller 20 and access the data in the memory blocks 31, 32 and 3n, respectively.

Figure 3:
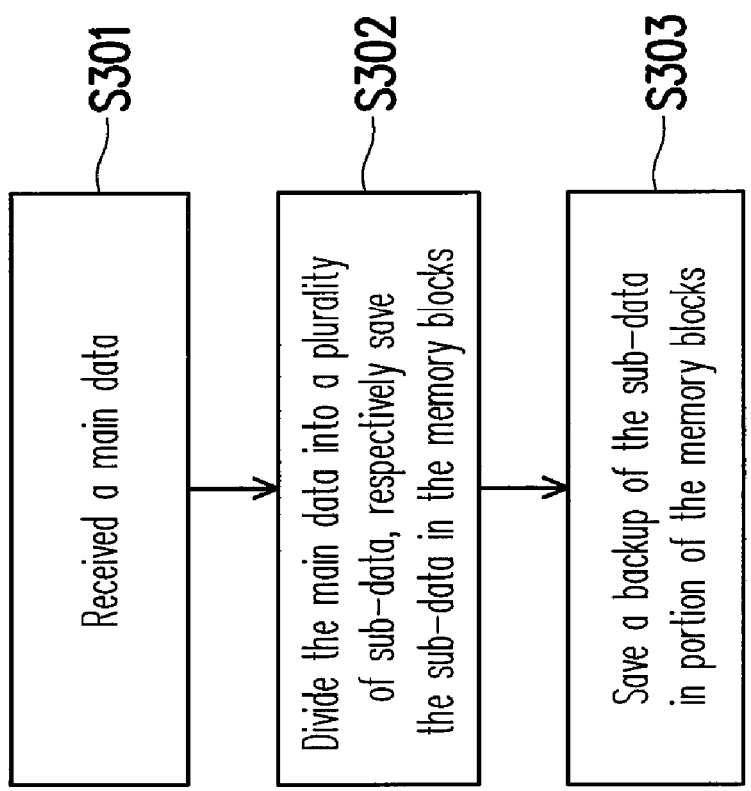
FIG. 3 is a flow diagram of a data access method according to the first embodiment of the present invention.

FIG. 3 is a flow diagram of a data access method according to the first embodiment of the present invention. As shown in FIGS. 2 and 3, in step S301, the main controller 20 receives a main data D10. Next, in step S302, the main controller 20 divides the main data D10 into a plurality of first sub-data (for example, D11~D12) and then the first sub-data D11 and D12 are respectively saved in the memory blocks 31 and 32 through the sub-controllers 21 and 22. Thereafter, the main controller 20 can save a backup of the first sub-data D11 and D12 in the memory block 3n (in step S303) through the sub-controller 2n. Therefore, when the first sub-data D11 and D12 of the memory blocks 31 and 32 are lost or damaged, the main controller 20 can use the backup of the first sub-data D11 and D12 in the memory block 3n to repair the first sub-data D11 and D12 in the memory blocks 31 and 32. Therefore, the non-volatile memory device 11 is prevented from not being able to output data because part of the data is lost or damaged.

When the main controller 20 needs to output the main data D10, the sub-controllers 21 and 22 respectively read the first sub-data D11 and D12 from the memory blocks 31 and 32. The main controller 20 combines the first sub-data D11 and D12 to form the main data D10 and outputs the main data D10. Because the sub-controllers 21 and 22 can be independently operated, the data access speed of the non-volatile memory device 11 can be increased through multiplexing.

In the foregoing embodiment, although the main controller 20 only divides the main data D10 into two first sub-data D11 and D12, the main controller 20 can divide the main data D10 into more parts in other embodiments. For example, the main data D10 can be divided into 10 parts so that 10 sub-controllers can be used to access the sub-data simultaneously and multiplexing can be used to increase the data access speed of the non-volatile memory device 11 substantially.

In addition, although the main controller 20 is shown only saves a backup of the first sub-data D11 and D12 in the memory block 3n in the foregoing embodiment, the main controller 20 can save the backup of the first sub-data D11 and D12 as single backup in different memory blocks. Not only this, the main controller 20 can also save the backup of the first sub-data D11 and D12 as multiple backup in a number of memory blocks. When the first sub-data D11 and D12 of the memory blocks 31 and 32 are lost or damaged, the backup of the first sub-data D11 and D12 saved in other memory blocks can be used to perform a repair. Therefore, the user does not have to worry about data lost or damage in the non-volatile memory device 11.

Figure 4:
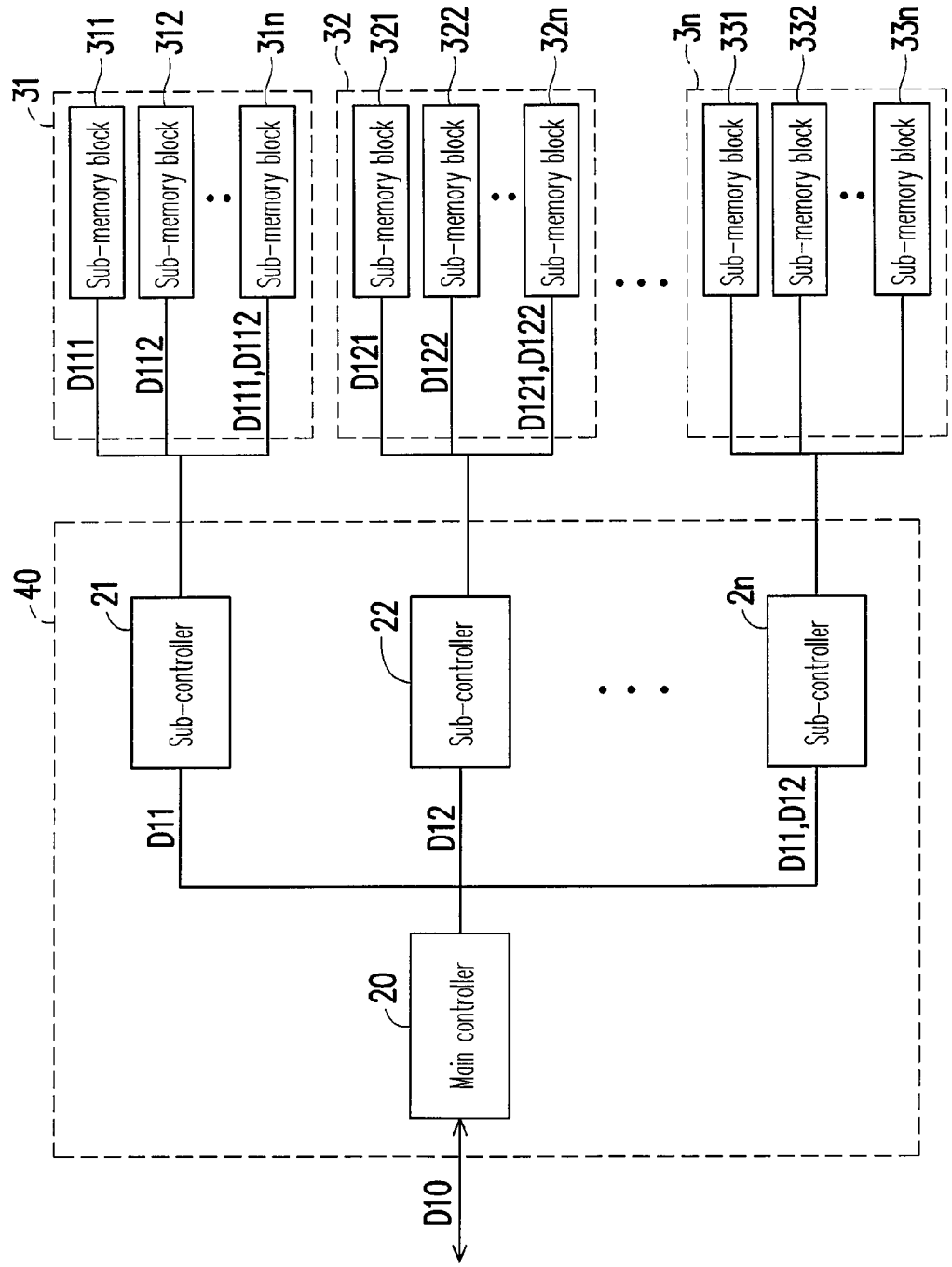
FIG. 4 is a diagram of a non-volatile memory device according to a second embodiment of the present invention.

FIG. 4 is a diagram of a non-volatile memory device according to a second embodiment of the present invention. As shown in FIG. 4, the operation of the main controller 20 and each of the sub-controllers (for example, indicated by 21~2n) in the present embodiment can be referred to the previous embodiment and a description is not repeated here. It should be noted that each of the memory blocks (for example, indicated by 31~3n) further includes a plurality of sub-memory blocks. For example, the memory block 31 includes a plurality of sub-memory blocks (for example, indicated by 311~31n), the memory block 32 includes a plurality of sub-memory blocks (for example, indicated by 321~32n) and the memory block 3n includes a plurality of sub-memory blocks (for example, indicated by 331~33n).

When the main controller 20 receives the main data D10, the main controller 20 can divide the main data D10 into a plurality of sub-data (for example, D11~D12). Then, the main controller 20 outputs the first sub-data D11 and D12 to the sub-controllers 21 and 22, respectively. The sub-controller 21 divides the first sub-data D11 into a plurality of second sub-data (for example, indicated by D111 and D112), and the second sub-data D111 and D112 are respectively saved in the sub-memory blocks 311 and 312. On the other hand, the sub-controller 22 divides the first sub-data D12 into a plurality of second sub-data (for example, indicated by D121 and D122), and the second sub-data D121 and D122 are respectively saved in the sub-memory blocks 321 and 322.

Accordingly, when the main controller 20 needs to output the main data D10, tasks are assigned to each of the sub-controllers and multiplexing is used to speed-up the data reading operation. For example, the sub-controller 21 can read out the second sub-data D111 and D112 from the sub-memory blocks 311 and 312, combine the second sub-data D111 and D112 into the first sub-data D11 and output the first sub-data D11 to the main controller 20. In the meantime, the sub-controller 22 can read out the second sub-data D121 and D122 from the sub-memory blocks 321 and 322, combine the second sub-data D121 and D122 into the first sub-data D12 and output the first sub-data D12 to the main controller 20. The main controller 20 combines the first sub-data D11 and D12 into the main data D10 and outputs the main data D10. Because the sub-controllers 21 and 22 can operate independently, data access speed of the non-volatile memory device 12 can be increased through multiplexing.

In addition, the main controller 20 or the sub-controller 21 in the foregoing embodiment can also save a backup of the second sub-data D111 and D112 in the sub-memory block 31n. Similarly, the main controller 20 or the sub-controller 22 can also save a backup of the second sub-data D121 and D122 in the sub-memory block 32n. Therefore, when the second sub-data D111 and D112 in the memory blocks 311 and 312 are lost or damaged, the main controller 20 or the sub-controller 21 can use the backup of the second sub-data D111 and D112 in the sub-memory block 31n to repair the second sub-data D111 and D112 in the sub-memory blocks 311 and 312.

Accordingly, when the second sub-data D121 and D122 in the memory blocks 321 and 322 are lost or damaged, the main controller 20 or the sub-controller 22 can use the backup of the second sub-data D121 and D122 in the sub-memory block 32n to repair the second sub-data D121 and D122 in the sub-memory blocks 321 and 322. Furthermore, the main controller 20 can save a backup of the data D11 and D12 in the memory block 3n through the sub-controller 2n. Since the backup method can be referred back to the first embodiment, a detailed description is omitted. Therefore, the non-volatile memory device 12 is prevented from not being able to output data because part of the data is lost or damaged.

It should be noted that although the foregoing embodiments have already described a few possible configurations of the non-volatile memory, anyone skilled in the art may notice that the design of the non-volatile memory device may be different for different manufacturers. Therefore, the applications of the present invention should not be limited only to the aforementioned configurations. In other words, the scope of the present invention is basically met when a non-volatile memory device having a plurality of sub-controllers is used for accessing data through multiplexing.

In summary, the embodiments in the present invention have at least the following advantages:

1. The main controller divides the received main data into a plurality of sub-data and saves each of the sub-data in a plurality of memory blocks by multiplexing through a plurality of sub-controllers. Therefore, the writing speed of data is increased.

2. The main controller reads out each of the sub-data by multiplexing through a plurality of sub-controllers. The main controller also combines the sub-data into a main data and outputs the main data. Therefore, the reading speed of data is increased.

3. The main controller or the sub-controllers save a backup of the sub-data in a plurality of memory blocks. As a result, losing or damaging of some of the sub-data can be avoided and the non-volatile memory device can have a higher error tolerance rate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-volatile memory device, comprising:
    a main controller;
    a plurality of sub-controllers, coupled to the main controller for executing tasks assigned by the main controller; and
    a plurality of memory blocks, respectively coupled to the sub-controllers,
    wherein the main controller is used to divide a received main data into a plurality of first sub-data and the first sub-data are respectively saved in the memory blocks through the sub-controllers;
    wherein the main controller also saves a backup of the first sub-data in a different memory block than that used to store the first sub-data.

2. The non-volatile memory device according to claim 1, wherein each memory block further comprises:
    a plurality of sub-memory blocks, respectively coupled to corresponding sub-controllers, wherein each of the sub-controllers divides a received first sub-data into a plurality of second sub-data and respectively saves the second sub-data in the sub-memory blocks of a corresponding memory block.

3. The non-volatile memory device according to claim 2, wherein each of the sub-controllers saves a backup of the second sub-data in a different memory block than that used to store the second sub-data.

4. The non-volatile memory device according to claim 1, wherein the non-volatile memory device is a flash memory.

5. A data access circuit adapted to a non-volatile memory having a plurality of memory blocks, the data access circuit comprising:
    a main controller; and
    a plurality of sub-controllers, respectively coupled to the memory blocks,
    wherein the main controller is used to divide a received main data into a plurality of first sub-data and the first sub-data are respectively saved in the memory blocks through the sub-controllers;
    wherein the main controller also saves a backup of the first sub-data in a different memory block than that used to store the first sub-data.

6. The data access circuit according to claim 5, wherein each of the memory blocks comprises:
    a plurality of sub-memory blocks, respectively coupled to corresponding sub-controllers, wherein each of the sub-controllers divides a received first sub-data into a plurality of second sub-data and respectively saves the second sub-data in the sub-memory blocks of a corresponding memory block.

7. The data access circuit according to claim 6, wherein each of the sub-controllers saves a backup of the second sub-data in a different memory block than that used to store the second sub-data.

8. The data access circuit according to claim 5, wherein the non-volatile memory device is a flash memory.

9. A data access method, adapted to a non-volatile memory having a plurality of memory blocks and each of the memory blocks having a plurality of sub-memory blocks, the data access method comprising:
    receiving a main data;
    dividing the main data into a plurality of first sub-data and respectively saving the first sub-data into the memory blocks; and
    saving a backup of the first sub-data in a different memory block than that used to store the first sub-data.

10. The data access method according to claim 9, further comprising:
    using the backup of the first sub-data to repair the first sub-data when the first sub-data are damaged.

11. The data access method according to claim 9, further comprising:
    reading the first sub-data;
    combining the first sub-data into the main data; and
    outputting the main data.

12. The data access method according to claim 9, wherein each of the memory blocks comprises a plurality of sub-memory blocks, the data access method further comprising:
    dividing each of the first sub-data into a plurality of second sub-data;
    respectively saving the second sub-data into the sub-memory blocks of a corresponding memory block; and
    saving a backup of the second sub-data in a different memory block than that used to store the second sub-data.

13. The data access method according to claim 12, further comprising:
    using the backup of the second sub-data to repair the second sub-data when the second sub-data are damaged.

14. The data access method according to claim 12, further comprising:
    reading the second sub-data; and
    combining the second sub-data into each of the first sub-data.

* * * * *